Sept. 27, 1938.  C. HEYERMANS ET AL  2,131,661
VEHICLE SUSPENSION DEVICE
Filed July 23, 1936   3 Sheets-Sheet 1

Inventors:
Charles Heyermans and
George W. L. Sartoris,
By Smith, Michael & Gardiner, Attys.

Sept. 27, 1938.   C. HEYERMANS ET AL   2,131,661
VEHICLE SUSPENSION DEVICE
Filed July 23, 1936   3 Sheets-Sheet 2
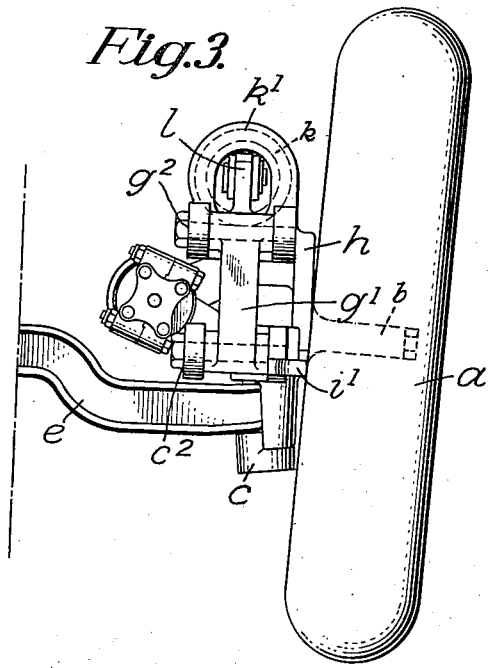
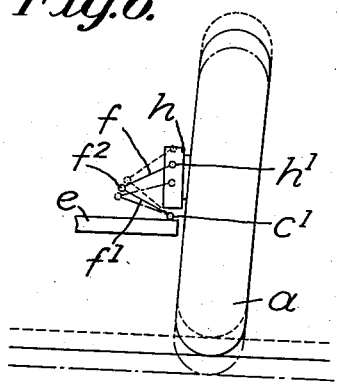
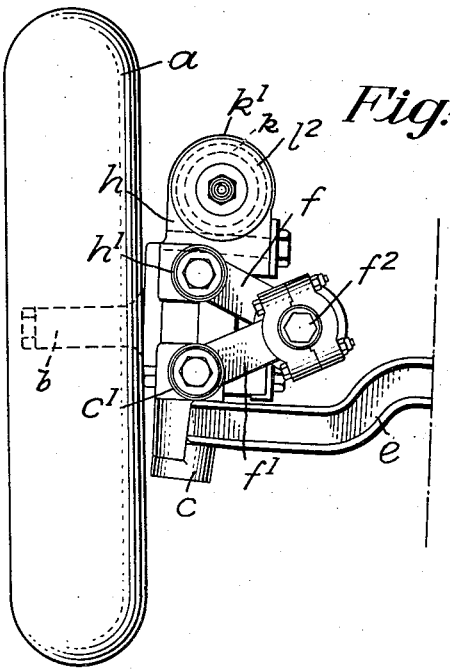
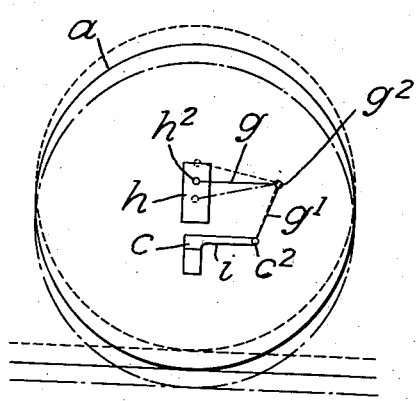
Inventors:-
Charles Heyermans & George W. L. Sartoris,
By: Smith, Michael & Gardiner,
Attorneys.

Sept. 27, 1938.  C. HEYERMANS ET AL  2,131,661
VEHICLE SUSPENSION DEVICE
Filed July 23, 1936   3 Sheets-Sheet 3

Patented Sept. 27, 1938

2,131,661

UNITED STATES PATENT OFFICE 2,131,661

VEHICLE SUSPENSION DEVICE

Charles Heyermans and George Urban Leonard Sartoris, London, England

Application July 23, 1936, Serial No. 92,236
In Great Britain December 19, 1935

5 Claims. (Cl. 280—95)

This invention relates to vehicle suspension systems and has for its main object to provide an improved spring suspension device, in which the up and down movement of the wheel in relation to the vehicle is controlled by folding links and resilient means.

A further object of the invention is to provide an improved spring suspension for the steering road wheels of vehicles, in which the up and down movement of the wheel is controlled by folding links which turn with the wheel in its steering deflections, the folding and unfolding of the links being controlled by springs mounted so as to turn likewise with the wheel in its steering deflections.

The invention is hereafter described with reference to the accompanying drawings in which:

Figs. 3 and 4 are opposite elevations at right angles to Fig. 1, as seen from front and rear respectively of the vehicle.

Figs. 5 and 6 are diagrams illustrating the motion of the linkage employed in Figs. 1 to 4.

Figure 1:
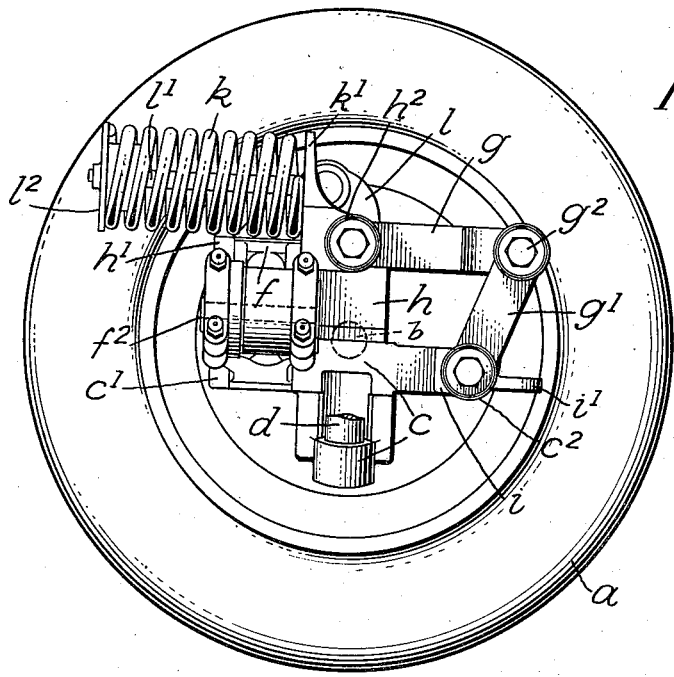
Fig. 1 is an elevation of one embodiment in the form of a front wheel suspension for a motor vehicle.
Figure 2:
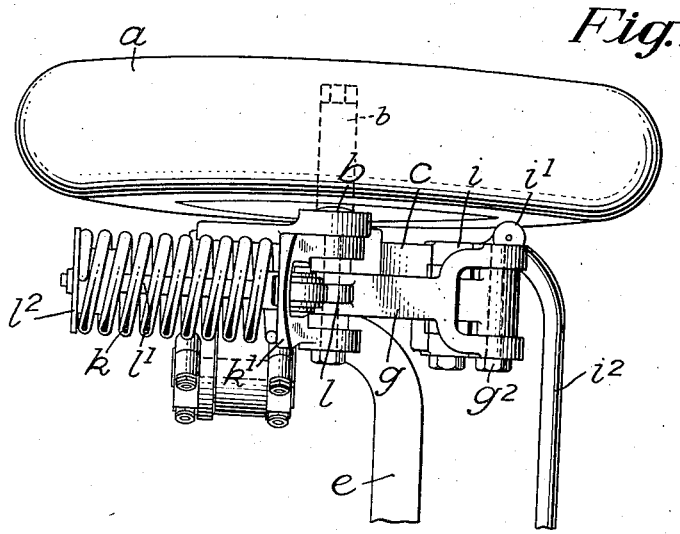
Fig. 2 is a plan view of Fig. 1.

Referring to Figs. 1 to 4, the wheel $a$ is rotatably mounted upon a stub axle $b$ suspended from a support $c$ which is adapted to swivel upon an inclined pivot pin $d$ fixed to the end of the axle $e$, the axle beam extending across the vehicle and being secured directly to the underside of the chassis (not shown). The support $c$ includes two forks $c^1$ $c^2$ extending horizontally and disposed, preferably, substantially at right angles to one another, the arms of these forks being bored out to receive the lower hinge-pins of two pairs of hinged links $f$ $f^1$ and $g$ $g^1$, folded to an acute angle, and the upper hinge-pins of these links engaging in a similar manner in the arms of two forks $h^1$ $h^2$ upon a member $h$ to which the stub axle $b$ of the wheel is secured, the forks $h^1$ and $h^2$ being preferably disposed substantially at right angles to one another.

In the arrangement illustrated, the links $f$ $f^1$ preferably work in a plane substantially at right angles to the plane of the wheel $a$, and the links $g$ $g^1$ preferably work in a plane substantially parallel to the plane of the wheel and substantially perpendicular to the plane including the pair of links $f$ $f^1$. In each pair, one of the links is forked to pass outside the other upon the hinge $f^2$ or $g^2$ between the two links. The links $f$ $f^1$ are shown of equal length and equally inclined to the horizontal, the hinge-pins at their remote ends being engaged in forks $c^1$ $h^1$ located one vertically below the other. The other links $g$ $g^1$ are shown of unequal length, one $g$ being substantially horizontal in the position illustrated and extending from the fork $h^2$ to the hinge $g^2$ between the links of this pair, while the second link $g^1$ is inclined from the hinge $g^2$ down to the fork $c^2$, which as shown is arranged upon a forward extension $i$ of the member $c$, this extension $i$ constituting the steering track arm and having a boss $i^1$ to which the track rod $i^2$ is connected.

The suspension spring $k$ is shown as a helical compression spring controlling the motion of one of the folding links about its pivot on the moving part $h$, the link $g$ being arranged as a bell crank lever having an arm $l$ extending up above the fork $h^2$ and connected by a rod $l^1$ to a washer plate $l^2$ at the rear end of the spring $k$, and the front end of the latter pressing against a vertical abutment $k^1$ integral with the member $h$. It will thus be seen that the rocking movement of the bell crank lever $l$—$g$ about the fork $h^2$ as a center, will provide a progressively increasing leverage as the wheel rises in relation to the axle, i. e., the arrangement is such that the effective leverage between the wheel and the spring decreases progressively as the wheel moves upwardly in relation to the axle. Thus the suspension is "softer" at the lower range of spring deflection than at the upper range, which tends to prevent bouncing or resonance.

As seen more clearly in Figs. 5 and 6, the vertical motion of the wheel $a$ will cause the pairs of folding links $f$ $f^1$, $g$ $g^1$ to vary their angular relation, their free extremities attached to the member $h$ approaching and receding from the other extremities attached to the support $c$ as the wheel falls and rises. Moreover, since the respective pairs of links preferably work in two substantially perpendicular vertical planes, the motion of the member $h$ will be restricted to a substantially vertical direction represented by the intersection of the two vertical planes. With links $f$ $f^1$ of equal length, the included angle may be approximately 60 degrees in the normal position, this angle being reduced to about 30 degrees at the limit of movement in one direction, when the member $h$ abouts upon the support $c$; during movement in the other direction, the links may unfold to an angle of 90 degrees or more, and may even open out into the straight-line position in case of an extreme shock. Similarly the links $g\,g^1$ may include an angle of approximately 60 degrees in the normal position, this angle being reduced and opened out, but not to precisely the same extent as in the case of the links $f\,f^1$, as the movement takes place.

Figure 7:
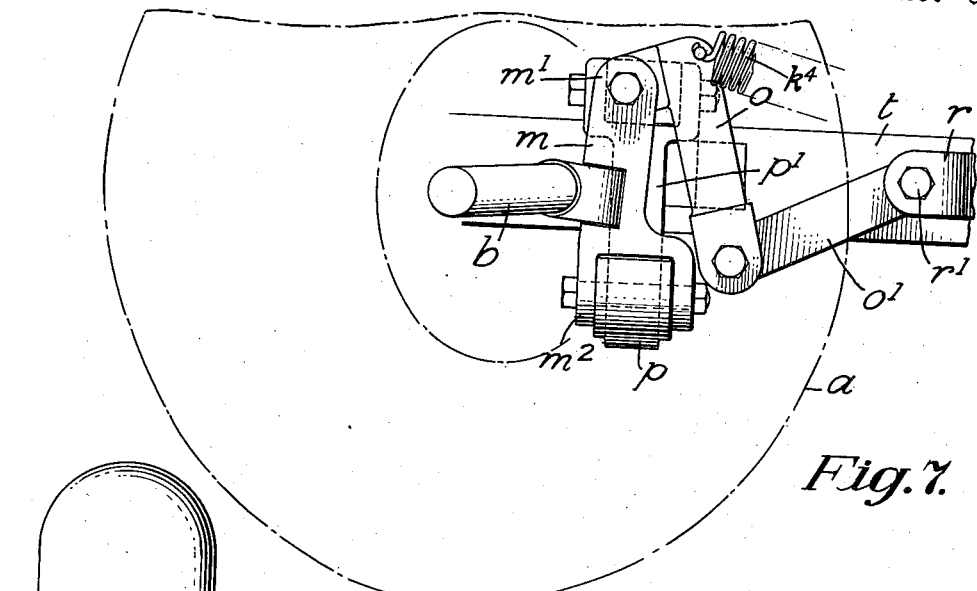
Fig. 7 is an oblique elevation of a vehicle wheel suspension constituting a second embodiment of the invention.
Figure 8:
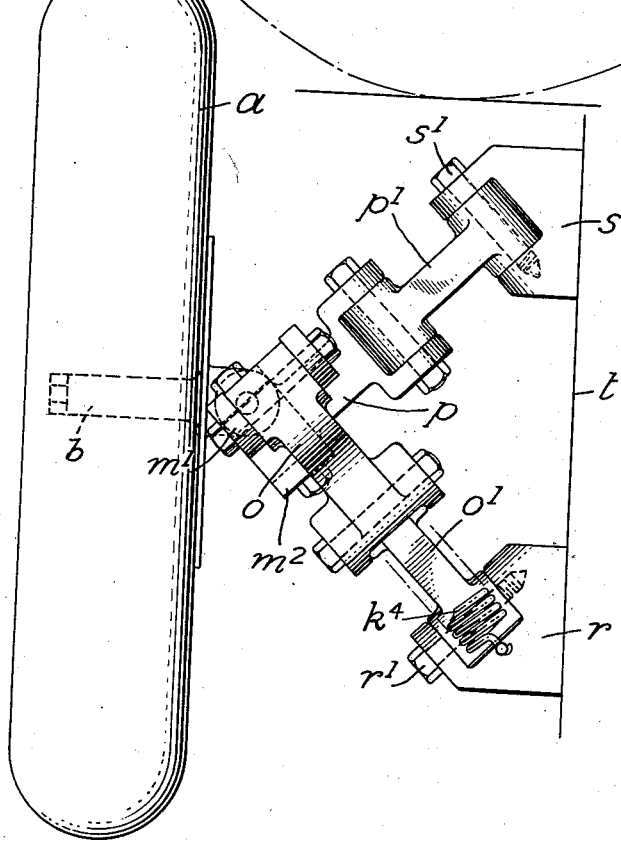
Fig. 8 is a plan of Fig. 7.

Figs. 7 and 8 represent the application of a second form of the invention to a similar vehicle suspension, the member $m$ to which the stub axle $b$ is pivoted being provided at its top and bottom ends with two horizontal forks $m^1$ and $m^2$ preferably disposed substantially at right angles to one another, the arms of these forks being bored out to receive the hinge-pins at the free extremities of two pairs of hinged links $o\,o^1$ and $p\,p^1$, of substantially equal length, folded to an obtuse angle of approximately 100 degrees in the normal position. The other extremities of these pairs of links are hinged upon horizontal axes $r^1\,s^1$ to a pair of forked brackets $r$, $s$, secured to the chassis member $t$ at a suitable distance apart, these axes being also preferably disposed substantially at right angles to one another.

One pair of folding links $o\,o^1$, hinged upon the axis $r^1$ as indicated in Fig. 8, work in a vertical plane inclined at approximately 45 degrees to the side of the chassis, the angle included between these links increasing and decreasing as the wheel rises and falls, while the other pair of links $p\,p^1$ hinged upon the axis $s^1$ work in a vertical plane inclined at approximately 45 degrees in the other direction. Therefore the member $m$ will be restricted to a substantially vertical rectilinear movement, so that the wheel $a$ and stub axle $b$, pivoted to this member $m$, will receive a substantially vertical motion. As seen in Fig. 7, the included angle of 100 degrees between the links $o\,o^1$ lies on the upper side of their center lines, but either or both pairs of links may be folded in such a way that the included angle lies below them. The suspension spring preferably consists of a tension spring connected to and extending between the bracket $r$ and the top of the link $o$, for example as indicated at $k^4$.

It will be understood that the relative dimensions of the folding links may be varied, as well as the angular extent of their folding or working movement. While in the accompanying drawings and in the specification we have elected to disclose and describe the pairs of links $f\,f^1$ and $g\,g^1$ as disposed in planes extending substantially at right angles to each other, it will be understood that this is merely the preferred form of our invention, and that it is not essential to the satisfactory operation of the device that the pairs of links be so disposed, i. e., the vehicle suspension device will satisfactorily operate if the pairs of links are arranged in planes which are not at right angles to each other but are materially angularly disposed relative to each other. Further, it is not essential that one pair of links be disposed in a plane parallel to the plane of the vehicle wheel and that the other pair of links be disposed in a plane perpendicular to the plane of said vehicle wheel as shown and described in connection with Figs. 1 to 6 of the accompanying drawings, as the pairs of links may be disposed in other angular relations to the plane of the vehicle wheel, such, for example, as shown in Figs. 7 and 8 of the accompanying drawings.

The invention may be applied to the suspension of wheels having a fixed plane of rotation, in which case one set of hinges for the folding links may be mounted directly upon the vehicle frame or upon an axle beam secured across the latter, and the other set of hinges upon a suitable fitting upon the wheel center or equivalent part. Shock-absorbing devices may be provided, if desired, in combination with the suspension springs.

If desired more than two pairs of folding links may be employed, for example two oppositely arranged pairs of links, these links being all of equal length with their hinge-axes all parallel, and a third pair of links arranged at right angles to the other two pairs.

It will be understood that each pair of folding links constitutes a kinematic chain of three closed turning pairs, each chain possessing two degrees of freedom in two perpendicular or other angularly related directions, and that by virtue of the angular relation of the kinematic chains, each chain acts to constrain another chain in one direction, leaving one degree of freedom between the two ends of the several chains for the straight-line relative motion of the parts to which they are connected.

What we claim is:

1. In a vehicle suspension system, the combination of a rotatable wheel, a movable journal member for said wheel, a support in fixed relation to the vehicle, pairs of folding links hinged together and also to said journal member and said support, the hinge-axes of each pair of said links being substantially parallel and the hinge-axes of the respective pairs being materially angularly disposed relative to one another, a crank arm moving with one of said links, a rod connected to said crank arm, a spring, an abutment for one end of said spring, and means on said rod for compressing said spring against said abutment by movement of said rod connected to said moving crank arm.

2. In a vehicle suspension system, the combination of a rotatable wheel, a journal member for said wheel, an axle forming part of the vehicle, a support for said journal member, said journal member being movable in approximately vertical relation to said axle, and said support being rotatable in angular relation to said axle around an approximately vertical axis, two pairs of links connecting said journal member to said support, the links of each of said pairs being hinged together and also to said journal member and said support upon substantially parallel horizontal axes materially angularly disposed relative to the hinge-axes of the other of said pairs of links, resilient means for controlling the hinge-movement of said links, said resilient means including a spring operating through lever mechanism, arranged to give a progressively increasing leverage as said wheel rises in relation to said axle and means for controlling the angular rotation of said support around said axis.

3. In a vehicle suspension system, the combination of a rotatable wheel, a journal member for said wheel, an axle forming part of the vehicle, a support for said journal member, said journal member being movable in approximately vertical relation to said axle, and said support being rotatable in angular relation to said axle around an approximately vertical axis, two pairs of links connecting said journal member to said support, the links of each of said pairs being hinged together and also to said journal member and said support upon substantially parallel horizontal axes materially angularly disposed relative to the hinge-axes of the other of said pairs of links, a crank arm moving with one of said links, a rod connected to said crank arm, a compression spring surrounding said rod, an abutment for one end of said spring, said abutment being carried by said support, a washer plate secured to said rod for engaging the other end of said spring, and means for controlling the angular rotation of said support around said axis.

4. In a vehicle suspension system, the combination of a rotatable wheel; a movable journal member for said wheel including a pair of angularly disposed bearings; means on said vehicle for supporting said journal, said means being rotatable on a substantially vertical pivotal axis and including a pair of angularly disposed bearings and pairs of folding links, each pair of links being hinged together at one end and having their opposite ends hinged, respectively, to one of the bearings on the journal member and on the supporting means, the hinge-axes of each pair of said links being substantially parallel and the hinge-axes of the respective pairs of links being angularly disposed to one another, whereby said links constitute the sole means for restricting said journal member to substantially straight-line vertical movement; resilient means for controlling the folding movement of said links; and means for moving said supporting means about its substantially vertical pivotal axis to effect steering of said vehicle.

5. In a vehicle suspension system, the combination of a rotatable wheel; an axle forming a part of the vehicle; a journal member for said wheel movable in approximately vertical relation to said axle and including a pair of angularly disposed bearings; a support on said axle including a pair of angularly disposed bearings, said support being rotatable with respect to said axle on a substantially vertical pivotal axis; pairs of folding links, each pair of links being hinged together at one end and having their opposite ends hinged, respectively, to one of the bearings on the journal member and on the support, the hinge-axes of each pair of said links being substantially parallel and the hinge-axes of the respective pairs of links being angularly disposed to one another, whereby said links constitute the sole means for restricting said journal member to substantially straight-line vertical movement; resilient means for controlling the folding movement of said links, and means for moving said support about its substantially vertical pivotal axis to effect steering of said vehicle.

CHARLES HEYERMANS.
GEORGE URBAN LEONARD SARTORIS.